United States Patent
Lu

(10) Patent No.: US 10,310,464 B1
(45) Date of Patent: Jun. 4, 2019

(54) SMART DEVICES KIT FOR RECESSED LIGHT HOUSING

(71) Applicant: Phorena, Inc., San Jose, CA (US)

(72) Inventor: Lawrence Trung Lu, San Jose, CA (US)

(73) Assignee: Phorena, Inc., San Jose, CA (US)

( * ) Notice: Subject to any disclaimer, the term of this patent is extended or adjusted under 35 U.S.C. 154(b) by 121 days.

(21) Appl. No.: 15/411,994

(22) Filed: Jan. 21, 2017

Related U.S. Application Data

(60) Provisional application No. 62/343,986, filed on Jun. 1, 2016.

(51) Int. Cl.
*G05B 15/02* (2006.01)
*H04L 29/08* (2006.01)
*H05B 37/02* (2006.01)

(52) U.S. Cl.
CPC ......... *G05B 15/02* (2013.01); *H05B 37/0245* (2013.01); *H04L 67/12* (2013.01)

(58) Field of Classification Search
CPC ...... G05B 15/02; H05B 37/0245; H04L 67/12
USPC ........................................... 315/32
See application file for complete search history.

(56) References Cited

U.S. PATENT DOCUMENTS

| | | | |
|---|---|---|---|
| 6,548,967 B1 | 4/2003 | Dowling et al. | |
| 8,033,686 B2 | 10/2011 | Recker et al. | |
| 8,829,799 B2 | 9/2014 | Recker et al. | |
| 9,049,753 B1 | 6/2015 | Wassel et al. | |
| 10,047,944 B2 * | 8/2018 | O'Brien | F21V 33/0052 |
| 2007/0164681 A1 | 7/2007 | Gagne et al. | |
| 2011/0075422 A1* | 3/2011 | Van De Ven | F21S 8/02 362/249.02 |
| 2012/0112633 A1 | 5/2012 | Lee | |
| 2015/0130359 A1* | 5/2015 | Bosua | H05B 37/0245 315/160 |
| 2016/0073479 A1* | 3/2016 | Erchak | F21S 9/022 315/51 |

\* cited by examiner

*Primary Examiner* — Daniel D Chang
(74) *Attorney, Agent, or Firm* — Kanika Radhakrishnan; Evergreen Valley Law Group

(57) ABSTRACT

The present invention relates to an assembly kit that fits inside are recessed light fixture, flush mount light fixture, tube light fixture, track light fixture or light tube that is mounted in/on the ceiling or wall for retrofitting various combinations of smart devices and sensors, as part of ambient intelligence.

15 Claims, 12 Drawing Sheets

US 10,310,464 B1

SMART DEVICES KIT FOR RECESSED LIGHT HOUSING

TECHNICAL FIELD

Embodiments of the disclosure relate to a smart devices kit for recessed light fixture(s) or tube light bulb(s) or tube light fixture or track light(s) or track light fixture or flush mount light fixtures.

BACKGROUND

Recessed, tube, flush mount, and track light fixtures, installed in ceilings and walls are in common use in residential and commercial buildings to provide a light source. Many smart devices and sensors need an electrical energy source and also need to be installed at fixed locations such as walls or ceilings. Housing for recessed, flush mount, tube or track light fixtures is the ideal enclosure to provide locations and energy source for smart devices and sensors.

Patent CN 2919296 Y discloses a hidden light source for portable electronic devices. Further, U.S. Pat. No. 6,948,831 B1 discloses an integrated assembly of motion-sensing electronics, optics and an electrical lamp fixture that is adapted for installation in a recess or a cavity in ceilings or on walls. Furthermore, Patent US 20070064433 A1 discloses to a recessed light assembly has an integrated loudspeaker.

In light of the above discussion, there seems to be a need for retrofitting current buildings to accommodate smart devices and sensors where locations and electricity are required. Housings such as those for recessed, tube, flush mount, and track light fixtures provide both electrical power and locations for smart devices and sensors. The dimension of the fixtures is also an ideal fit for the packaging the devices. Recessed light and flush mount light housings are the ideal enclosure to provide locations and energy source for smart devices and sensors.

OBJECT OF INVENTION

The principal object of the embodiments herein is to provide housing for connected smart devices and sensors fitting inside wall or ceiling mounted recessed, flushed, tube, and track light fixtures, including but are not limited to, cans or other forms of housing.

Another object of the embodiments herein is to provide housing for electronic circuitry or module that serves as a hub, access point, range extender for digital communication based on standards, including but not limited to, Wi-Fi or Bluetooth.

Yet another object of the embodiments herein is to provide alternate embodiments of the recessed, flush mount, tube and track light cans integrated with a smart device housing to enable pluggable units.

An additional object of the embodiments herein is to use the smart devices as a stand alone appliance within a room of the building, or as a group of interconnected and/or complementary smart devices installed at various locations within the building managed by software.

SUMMARY

The present invention relates to a kit assembly for an interchangeably connected the computer and/or smart devices to be installed in a recessed, flush mount, tube or track light fixture. The kit assembly includes a socket connector including a wire with a male Edison socket (or a different type of socket appropriate for the light fixture being retrofitted) at one end and a universal electrical connector at the other end. Further, the kit assembly includes a retrofitting kit comprising of a socket connector, torsion springs and/or spring connector and/or other connector(s), and a smart devices and sensor unit. Furthermore, the kit assembly includes software that controls at least one of a pivot and rotation of the base of the kit to direct the inputs and outputs of the smart devices and sensors. Moreover, the kits assembly includes multiple smart devices within a building or any logical boundary that can be managed and provisioned by software.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE VIEWS OF DRAWINGS

In the accompanying figures, similar reference numerals may refer to identical or functionally similar elements. These reference numerals are used in the detailed description to illustrate various embodiments and to explain various aspects and advantages of the present disclosure.

Figure 14:
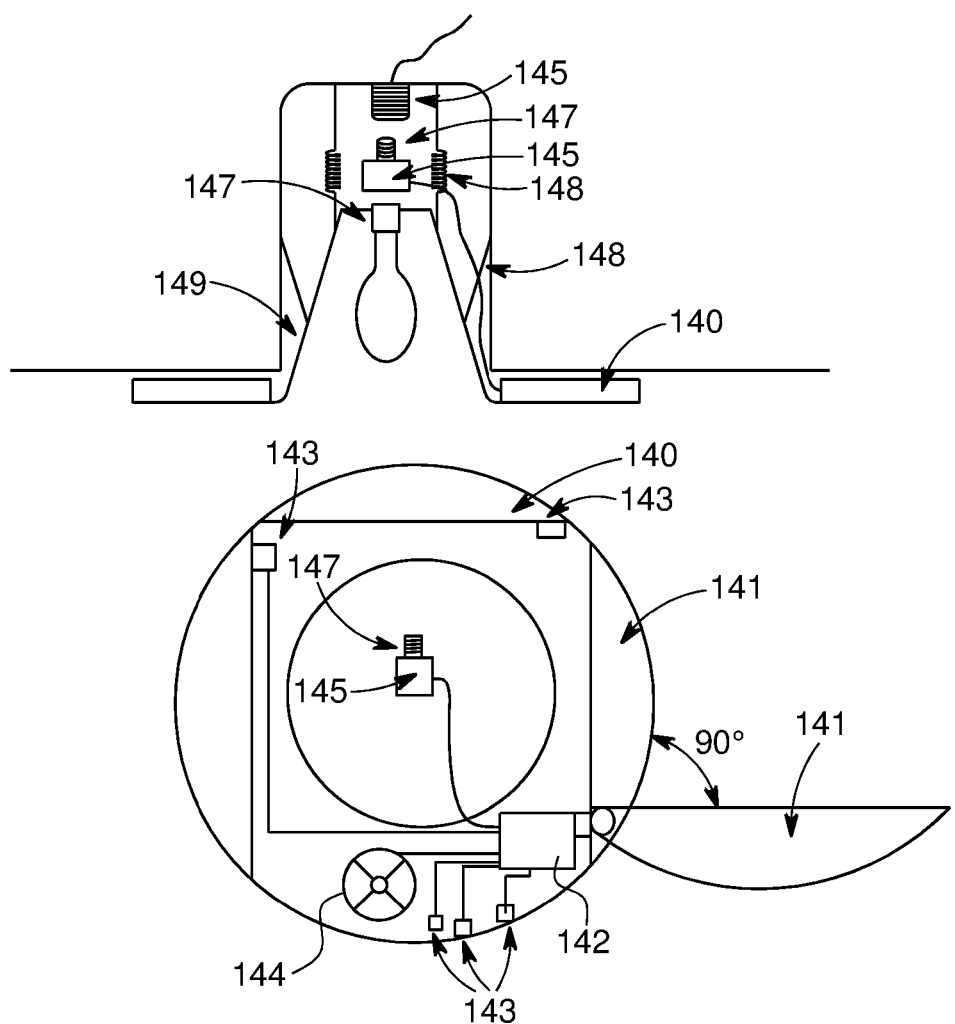
Figure 15:
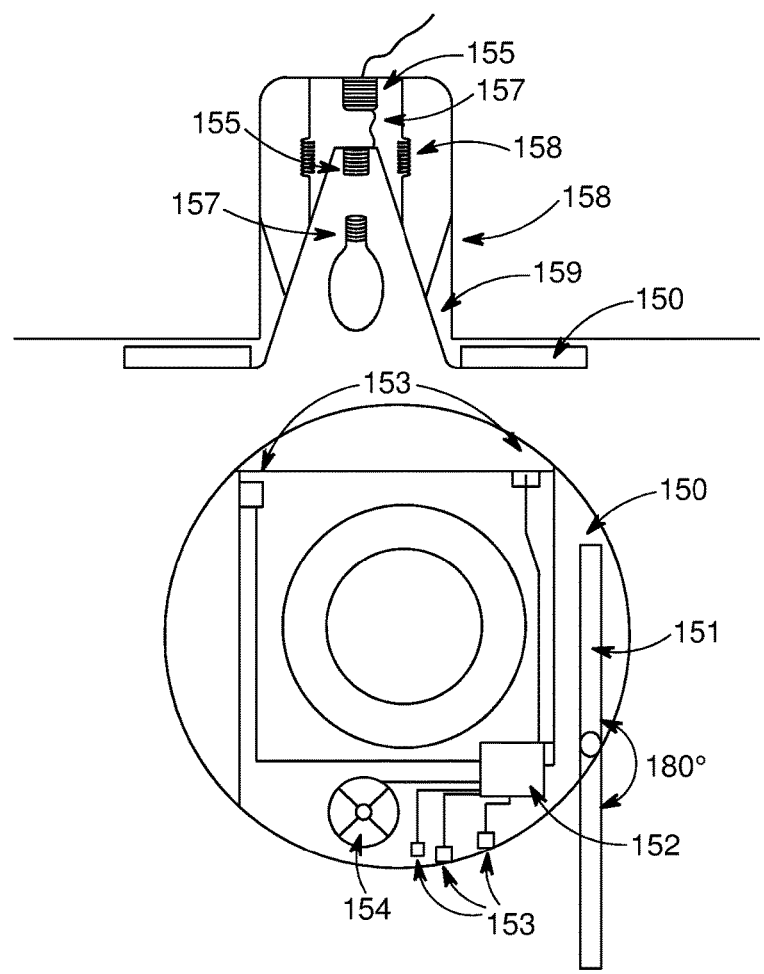
Figure 16:
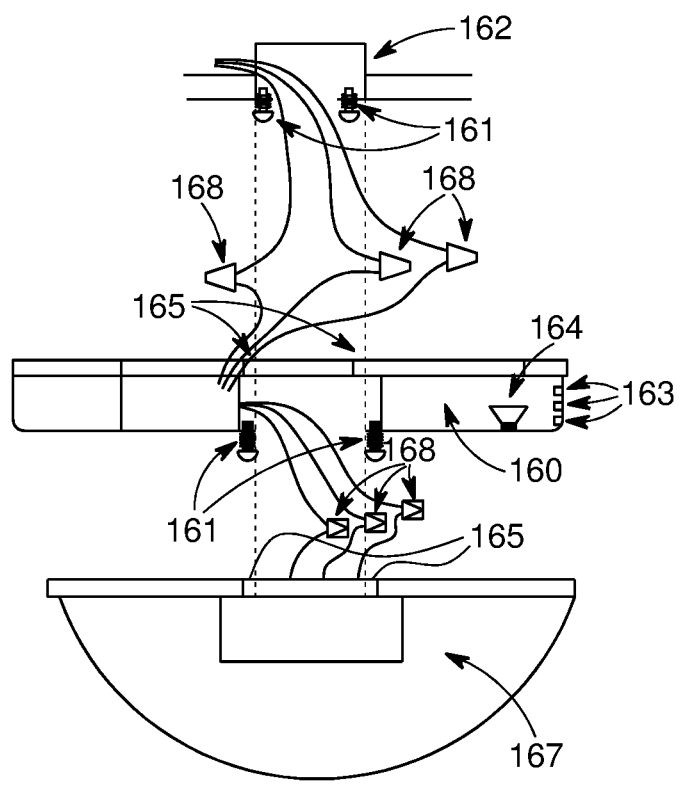
Figure 17:
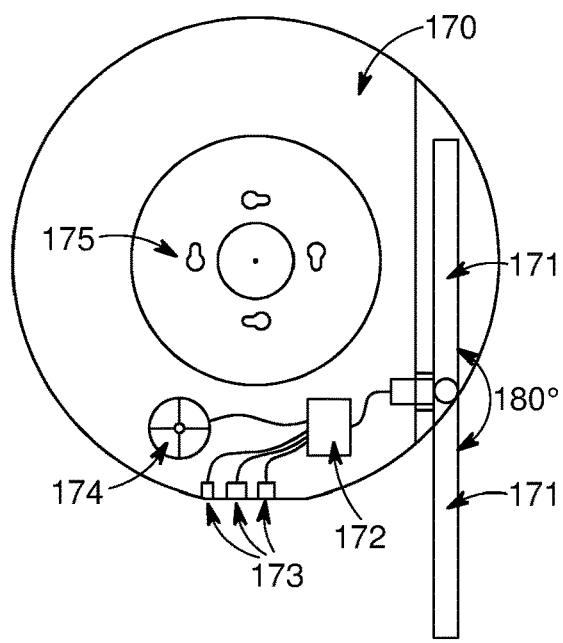
Figure 18:
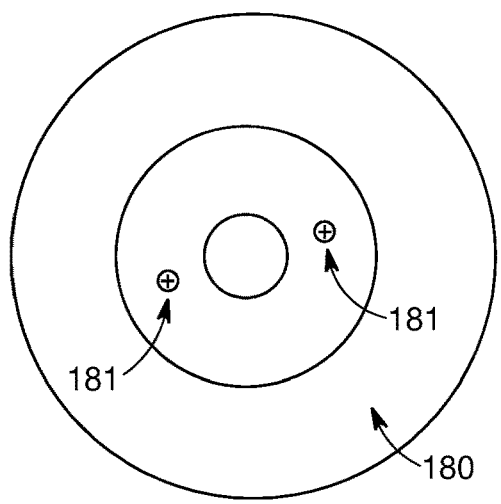
Figure 19:
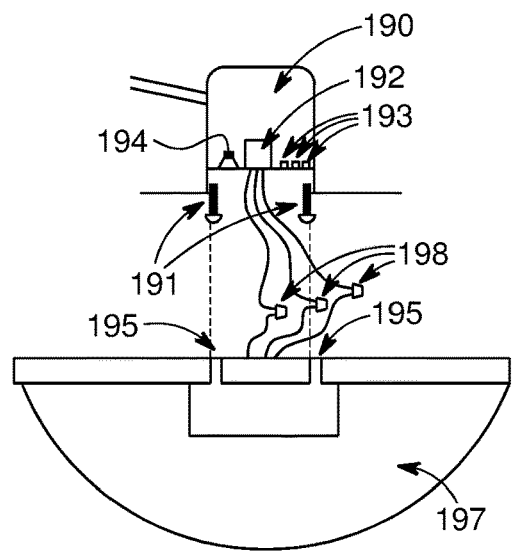
Figure 20:
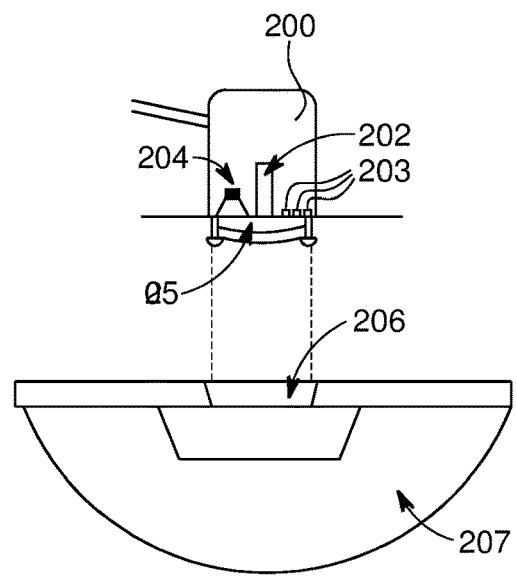

FIG. 14 is a side view and bottom of an example of smart device retrofitting unit for a recessed light fixture with a removable electrical adapter, and separated sensors, computer, smart devices, communication module, camera, projector, external ports (USB, HDMI, electrical outlet, etc.), using existing baffle trim, light bulb, and spring connectors, according to the embodiments as disclosed herein;

FIG. 15 is a side view and bottom of an example of smart device retrofitting unit for a recessed light fixture with an attached electrical adapter, sensors, computer, smart devices, communication module, camera, projector, external ports (USB, HDMI, electrical outlet, etc.), baffle trim and spring connectors, using existing light bulb according to the embodiments as disclosed herein;

FIG. 16 is a side view of an example of smart device retrofitting unit for a flush mount light fixture with an attached sensors, computer, smart devices, communication module, camera, projector, external ports (USB, HDMI, electrical outlet, etc.) sitting between the outlet box and existing light fixture according to the embodiments as disclosed herein;

FIG. 17 is a top-down view of an example of smart device retrofitting unit for a flush mount light fixture with an attached sensors, computer, smart devices, communication module, camera, projector, external ports (USB, HDMI, electrical outlet, etc.) sitting between the outlet box and existing light fixture according to the embodiments as disclosed herein;

FIG. 18 is a bottom-up view of an example of smart device retrofitting unit for a flush mount light fixture with an attached sensors, computer, smart devices, communication module, camera, projector, external ports (USB, HDMI, electrical outlet, etc.) sitting between the outlet box and existing light fixture according to the embodiments as disclosed herein;

FIG. 19 is a side view of an example of smart device retrofitting unit for a flush mount light fixture with an attached sensors, computer, smart devices, communication module, camera, projector, external ports (USB, HDMI, electrical outlet, etc.) inside the casing box for existing light fixture according to the embodiments as disclosed herein;

FIG. 20 is a side view of an example of smart device retrofitting unit for a flush mount light fixture with an attached sensors, computer, smart devices, communication module, camera, projector, external ports (USB, HDMI, electrical outlet, etc.) inside the casing box for integrated attachment for light fixture according to the embodiments as disclosed herein.

DETAILED DESCRIPTION OF THE EMBODIMENTS

The above-mentioned needs are met by a smart device kit for recessed light housing or flush mount light housing or tube light bulb(s) or tube light fixture or track light(s) or track light fixture. The following detailed description is intended to provide example implementations to one of ordinary skill in the art and is not intended to limit the invention to the explicit disclosure, as one ordinary skill in the art will understand that variations can be substituted that are within the scope of the invention as described.

These and other features of the present invention will become readily apparent upon further review of the following specification and drawings. Other goals and advantages of the invention will be further appreciated and understood when considered in conjunction with the following description and accompanying drawings. While the following description may contain specific details describing particular embodiments of the invention, this should not be construed as limitations to the scope of the invention, but rather as an exemplification of preferable embodiments. For each aspect of the invention, many variations are responsible as suggested herein that are unknown to those of ordinary skill in the art. A variety of changes and modifications can be made within the scope of the invention without departing from the spirit thereof.

The following detailed description is intended to provide example implementations to one of ordinary skill in the art and is not intended to limit the invention other explicit disclosure. As one of ordinary skill in the art will understand, variations can be substituted that are within the scope of the invention as described.

Edison socket, male adapter: 1, 147, 157
Edison socket, female adapter: 10, 145, 155
Brackets: 2
Wire hooks and/or springs: 3, 148, 158
Device housings or device fixture: 4, 33, 43, 45, 81, 97, 237, 247, 127, 137, 140, 150, 160, 170, 180, 190, 200
Attachment hole: 5
Attachment spring and hook: 11, 148, 158
Electrical connectors, male and female: 14, 19
Interchangeable smart devices, sensors, computer, wire-free charging transmitter, and/or battery: 7, 17, 28, 92, 141, 142, 151, 152, 172, 192, 202
Recessed light can: 8, 80
Cover plate: 9
External interface and/or port (USB, HDMLI, electrical outlet, etc): 6, 26, 66, 76, 91, 143, 153, 163, 173, 193, 203
USB, HDMI, electrical, etc. cables: 25, 83, 84,
Spring/Hook connector ring: 12, 13
Microphones, speakers, cameras, or projectors: 15, 16, 22, 23, 24, 29, 95, 96, 99, 82, 144, 154, 164, 174, 194, 204
Speaker: 21, 31, 41
LED lights: 20, 30, 40, 90
Antennas for wireless modules: 27, 93
Fans: 35, 75
Bladeless fan: 42, 44, 232, 242

Light tube housing, double light tube housing, or light tube fixture: 94
Electrical connectors: 97, 98
Wall: 85
Table top, counter top, pool table, floor, flat surface, etc.: 86, 87
Projected images and/or videos: 88, 89
Retrofitted pluggable can: 58
Retrofitted pluggable kit: 67, 77
Enclosure locks: 59, 69, 79
Vent, air filter, humidifier, fan: 243
Fan connector: 244
Wires (electrical, fiber optics, Ethernet): 53, 54, 55, 121
Air ducts (inlet, outlet): 50, 51
Water tube: 52
Wire connectors (electrical, fiber optics, Ethernet): 63, 64, 65
Air duct connectors (inlet, outlet): 60, 61
Water tube connector: 62
Tube light fixture retrofitted kit: 231, 241
Radio waves or RF: 122, 132
Light: 123, 133
Computer or electronic device: 131
Outlet box: 162
Wire nut: 168, 198
Keyhole slot: 165, 175, 195
Mounting screw: 161, 181, 191
Flush mount lighting fixture: 167, 197, 207
Baffle trim: 149, 159

The terms "an" and "a" herein do not denote a limitation of quantity, but rather denote the presence of at least one of the referenced items.

Embodiments according to the present invention include a retrofit kit (4, 33, 43, 45, 81, 77, 97, 237, 247, 127, 137, 140, 150, 160, 170, 180, 190, 200) for connected interchangeable smart devices and sensors (7, 17, 28, 92, 237, 247, 15, 16, 22, 23, 24, 29, 95, 96, 99, 82, 144, 154, 164, 174, 194, 204, 141, 142, 151, 152, 172, 192, 202) that are installed and connected to a recessed light can (8,58). The kit power source comes from the connection of the male Edison screw socket (1, 147, 157) to the female Edison screw socket fixture (10, 145, 155). In another embodiment, the power source can also come from other connections, including but not limited to a compatible retrofitted pluggable kit (67, 77) that plugs into retrofitted pluggable can 58, or into a can that has an existing compatible plug.

Figure 3:
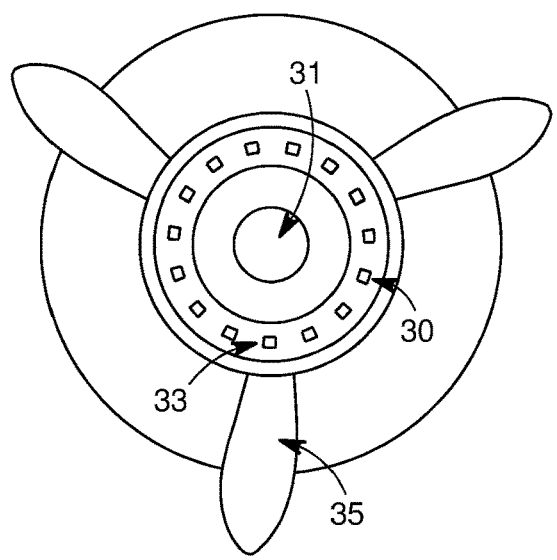
FIG. 3 is a bottom view of an example of a light housing and smart device retrofitting unit, similar to FIG. 2, with an additional external fan, according to the embodiments as disclosed herein.
Figure 4:
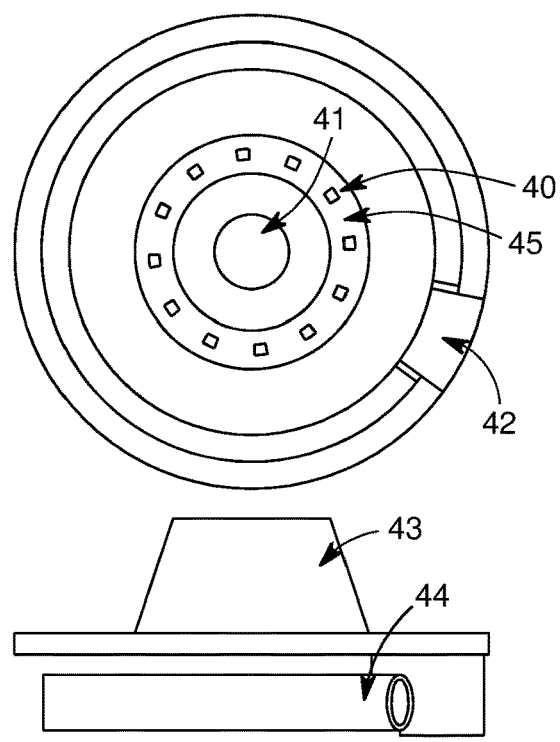
FIG. 4 is a bottom view of an example of a light housing and smart device retrofitting unit, similar to FIG. 2, with an additional bladeless external fan, according to the embodiments as disclosed herein.

FIGS. 3, 4 show examples of a housing with a fan attached, including blades (35) and bladeless fans (42, 44). The base of the fan may pivot and/or rotate. The fan's functionalities, including blades, spin directions, speed, and pivot, are controlled manually and/or by hardware and software.

Figure 1:
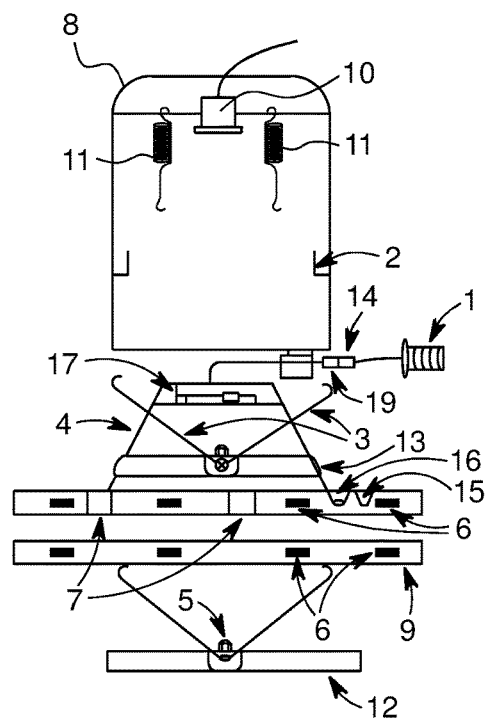
FIG. 1 is a side view of an example of smart device retrofitting unit with electrical adapter, sensors, computer, smart devices, communication module, camera, projector, external ports (USB, HDMI, electrical outlet, etc.) and spring connectors, according to the embodiments as disclosed herein.
Figure 2:
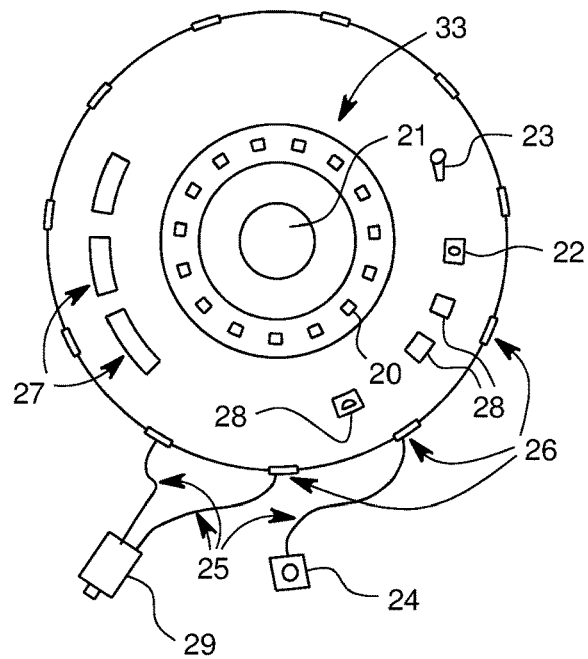
FIG. 2 is a bottom view of an example of smart device retrofitting unit with electrical adapter, sensors, computer, smart devices, communication module, camera, projector, speaker, microphone, electric light, external ports (USB, HDMI, electrical outlet, etc.) according to the embodiments as disclosed herein.
Figure 5:
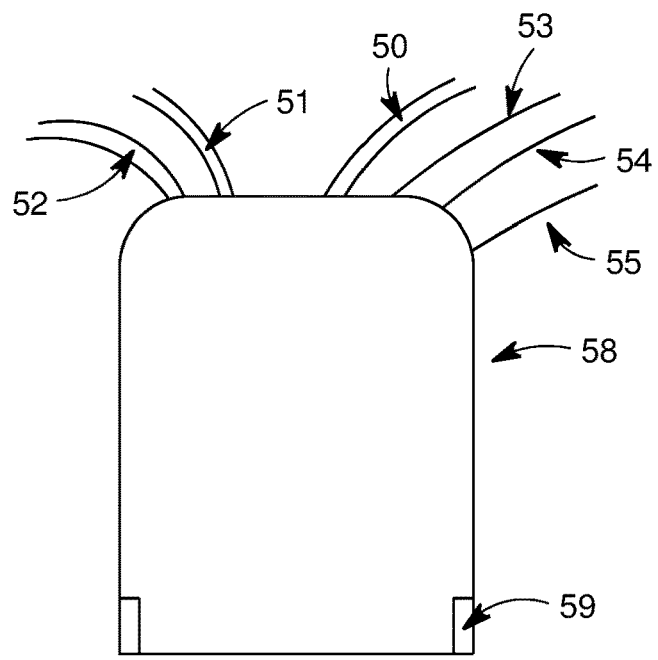
FIG. 5 is a side view of an example of a retrofitting integrated can with additional connections: air ducts, water pipes, gas pipes, chemical pipes, fiber optics, copper wires, according to the embodiments as disclosed herein.
Figure 6:
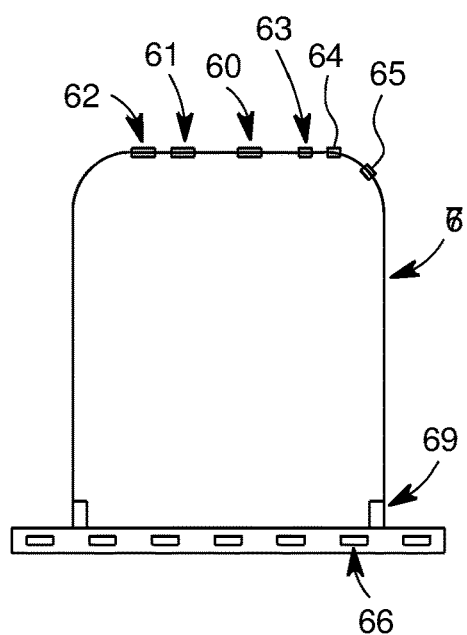
FIG. 6 is a side view of an example of a retrofitting smart device unit that plugs into the integrated can of FIG. 5, according to the embodiments as disclosed herein.
Figure 7:
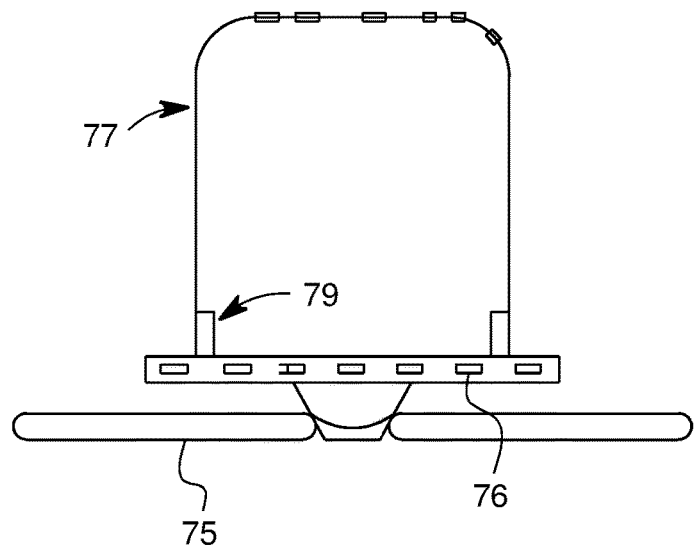
FIG. 7 is a side view of an example of a retrofitting smart device unit with a fan that plugs into the integrated can of FIG. 5, according to the embodiments as disclosed herein.
Figure 8:
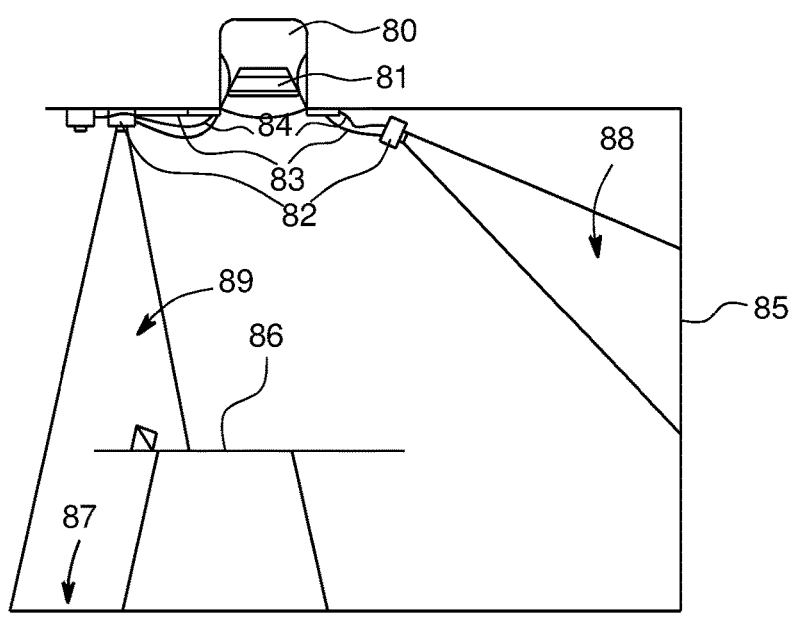
FIG. 8 is a side view of an example of a retrofitting smart device unit scanning and/or locating objects, and displaying images and/or videos on the wall, table, and floor according to the embodiments as disclosed herein.
Figure 9:
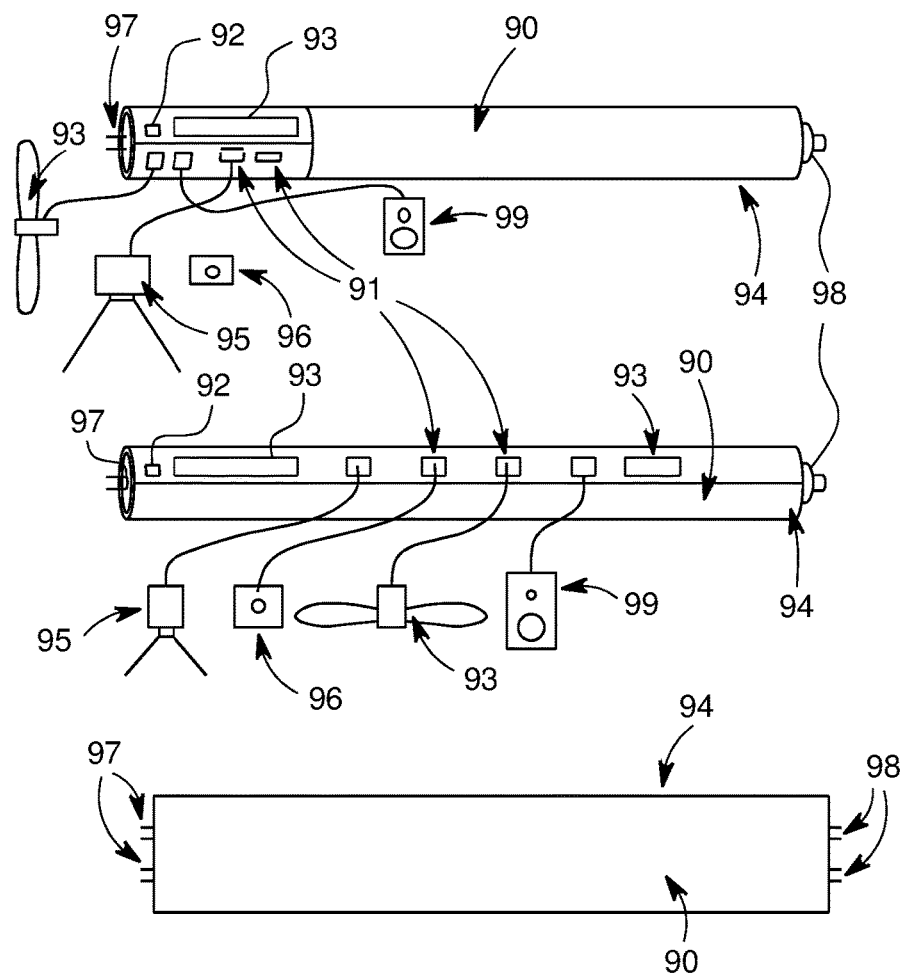
FIG. 9 is a bottom view and side views of an example of a retrofitting smart device unit replacing tube light bulbs, according to the embodiments as disclosed herein.
Figure 10:
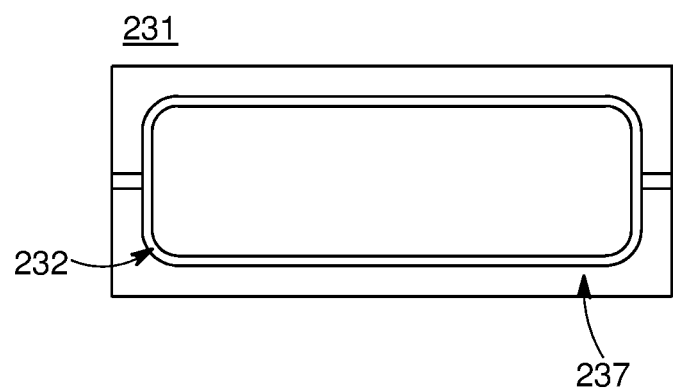
FIG. 10 is a bottom view of an example of a retrofitting smart device unit replacing tube light bulbs or tube light fixture with a bladeless fan that can rotate and extend, according to the embodiments as disclosed herein.
Figure 11:
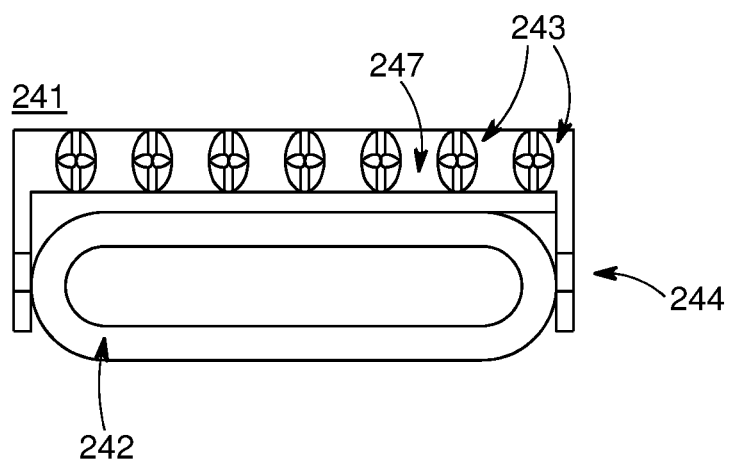
FIG. 11 is a side view of an example of a retrofitting smart device unit replacing tube light bulbs or tube light fixture with a bladeless fan that can rotate and extend, according to the embodiments as disclosed herein.
Figure 12:
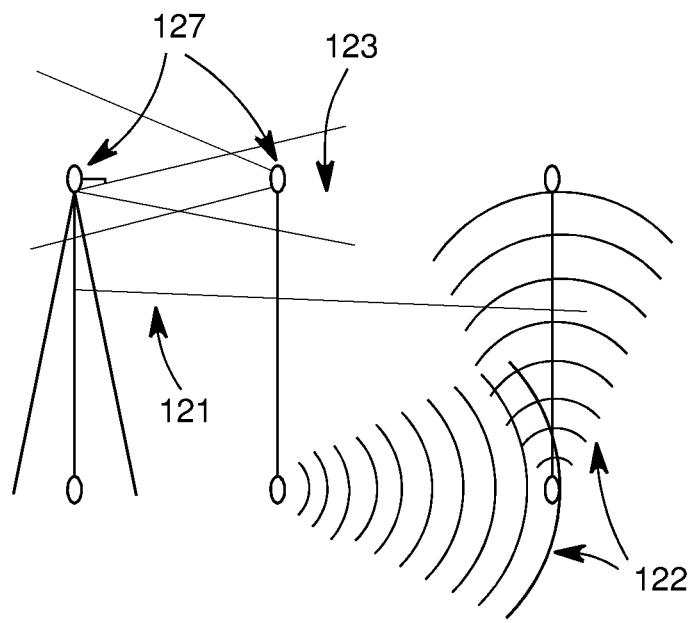
FIG. 12 is a bottom view of an example of a retrofitting smart device kits using combination of wired and/or wireless networks such as Wi-Fi, Li-Fi, Bluetooth, ZigBee, UWB, Ethernet, and/or fiber optic to form a mesh network to communicate with each other, with other devices, and with the Internet, according to the embodiments as disclosed herein.
Figure 13:
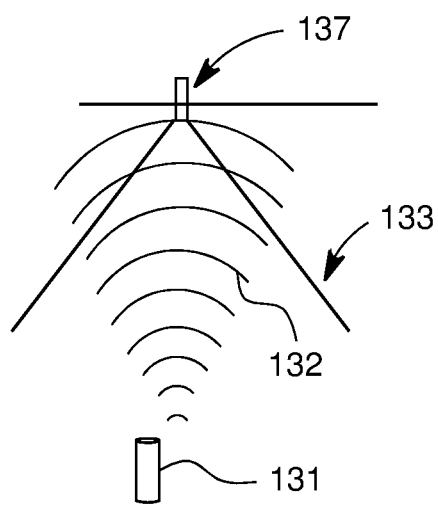
FIG. 13 is a side view of an example of a retrofitting smart device kits using combination of wired and/or wireless networks such as Wi-Fi, Li-Fi, Bluetooth, ZigBee, UWB, Ethernet, and/or fiber optic to form a mesh network to communicate with each other, with other devices, and with the Internet, according to the embodiments as disclosed herein.

FIG. 1 shows examples of types of attachments for the kit to the can. The torsion springs 3 are pushed up into the fixtures brackets 2 and lift the device into place. In another embodiment, the attached springs (11, 148, 158) are connected to rings 5 to lift the device into place. FIGS. 5, 6, 7 show examples of an integrated can and kit for exchangeable and pluggable kits (67, 77), where inputs and outputs (50, 51, 52, 53, 54, 55, 60, 61, 62, 63, 64, 65) are connected to the can. The locks (59, 69, 79) secure the fixture to the can. These are examples of methods for securing the kit to the can, but these are not the only methods.

The computer and the I/O modules (7, 17, 28, 92, 237, 247, 15, 16, 22, 23, 24, 29, 95, 96, 99, 82, 144, 154, 164, 174, 194, 204, 141, 142, 151, 152, 172, 192, 202) can be inside the housing of the kit (4, 33, 43, 45, 81, 97, 237, 247, 127, 137, 140, 150, 160, 170, 180, 190, 200) or connected with external interfaces (6, 26,66, 76, 91, 143, 153, 163, 173, 193, 203). The input units include but are not limited to microphone(s), camera(s), a security camera(s), infrared camera(s), OCR(s), temperature sensor(s), chemical sensor(s), light sensor(s), a moisture sensor, a touch sensor, a motion sensor, a smoke detector, a carbon monoxide detector, a radar, a LIDAR, a radio waves receiver, an RFID reader, battery, wireless charger, and/or a GPS receiver. The output units include but are not limited to video projector(s), 2D/3D hologram projector(s), speaker(s), fan(s), light(s), laser(s), a heater, an air filter, an air conditioner, a humidifier, a dehumidifier, mist dispenser, chemical dispenser, a wireless charging station, and/or a docking station for drones and/or robots (15, 16, 22, 23, 24, 29, 95, 96, 99, 82, 144, 154, 164, 174, 194, 204). Similar to the fan's functionalities, the modules are controlled by hardware and software.

It is a feature and aspect of the present invention to provide housing for connected smart devices and sensors fitting inside wall or ceiling mounted the recessed, flush mount, tube, and track light fixtures, including but not limited to, cans or other forms of housing. Cable adapters connect the unit to an existing electrical adapter and/or electrical outlets such as an Edison socket, three-prong electrical outlet, and other types of connectors. As part of the ambient intelligence, these devices are interconnected and managed by users and/or software agents running on the cloud and/or on mobile devices and/or the devices themselves to deliver customized and/or adaptable user experience based on individuals, groups, and/or objects.

An assembly fitting inside a recessed, tube and track light can, or a canister that is mounted in/on the ceiling or wall can be retrofitted as a hub for multiple modular, interchangeable smart devices and sensors, controlled by hardware and software that are connected with each other, with other devices, and/or to the Internet. The communication interface between the modules and the main unit is USB or other standard wired or wireless interface and/or protocols. The input and output interfaces of the smart devices and sensors are controlled by software running on computer(s) in a kit and/or over a network in concert to support and/or direct people, devices, robots, and drones in carrying out their activities and tasks. On a device or a group of synchronized devices, the software can run digital assistant, music players, video games, video streaming, instructional videos, video/audio conferencing, telepresence, virtual reality, augmented reality, map, direction guidance, object locator and monitoring, people locator and monitoring, building monitoring, event monitoring, intercom, thermostat, humidity monitor, air filter, humidifier, cooling, heating, cloud services, and other applications. The computer and/or the smart devices and sensors have one or more of the following but are not limited to: lights, Wi-Fi adapter, Wi-Fi access point, Wi-Fi repeater, microphone, camera, a security camera, infrared camera, temperature sensor, chemical sensor, loudness sensor, light sensor, moisture sensor, motion sensor, photoelectric motion detector, photoelectric light sensor, smoke detector, carbon monoxide detector, radar, LIDAR (Light Detection And Ranging), radio wave receiver and/or sender, RFID reader, GPS receiver, video projector, 2D/3D hologram projector, speaker, fan, bladeless fan, laser, heater, air conditioner, humidifier, dehumidifier, chemical dispenser, docking station for a drone, docking station for a robot, battery, wireless charger, and the like. The input interface can be a combination of voice, visual, motion, gesture, temperature, humidity, chemical, radar signal, laser, and other inputs. The output can be a combination of light, laser, image, video, 3D hologram, sound, warm air, cool air, water vapor, chemical, and electronic alarm or event.

It is still a further aspect of the invention to provide alternate embodiments of the recessed, flush mount, tube, and light track cans integrated with a smart device housing to enable pluggable units. In addition to an electrical connection, the integrated cans can have additional connections to other fixtures in the building such as, but not limited to, air ducts, water pipes, gas pipes, chemical pipes, fiber optics, and copper wires.

This invention further enables the use of the smart device as a stand-alone appliance within a room of the building, or as a group of interconnected and/or complementary smart devices installed at various locations within the building managed by a central console accessible via the web or mobile application.

Through an illustrative embodiment of the invention has been shown and described, it is to be understood that various modifications and substitutions may be made without departing from the novel spirit and scope of the present invention.

Accordingly, the disclosure of the present invention is intended to be illustrative, but not limiting, of the scope of the invention, which is set forth in the following claims.

The invention claimed is:

1. A kit assembly to interchangeably connect at least one of a computing device, a plurality of smart devices, and a plurality of sensors, and to be installed in a recessed light fixture, comprising:
   a first socket connector including at least one electrical connector appropriate for the light fixture being retrofitted;
   a retrofitting kit comprising a second socket connector, at least one spring connector, and a communication unit;
   the plurality of smart devices, within a building or any logical boundary, managed and provisioned by a software; and
   a bladeless fan assembly, comprising:
      a motor mounted inside a housing;
      a hollow airflow guiding frame and a flow guiding set affixed to the housing; and
      an electronic control unit that controls the speed and direction of the fan, and the pivot and rotation of the housing.

2. The kit assembly of claim 1, wherein the software controls at least one of a pivot and rotation of a base of the kit to direct an input and an output of the plurality of smart devices and the plurality of sensors.

3. The kit assembly of claim 1, wherein a communication among the plurality of sensors, the computing device, and the plurality of smart devices is a combination of wired and/or wireless protocol such as Wi-Fi, Li-Fi, Bluetooth, ZigBee, UWB, USB, HDMI, Ethernet, and/or fiber optic.

4. The kit assembly of claim 1, wherein the plurality of smart devices and the plurality of sensors are wired or wireless network access points and/or repeaters including but not limited to Wi-Fi access points, Wi-Fi repeaters, microcell repeater, or microcell access point.

5. The kit assembly of claim 1, wherein the plurality of smart devices and the plurality of sensors are part of one or more mesh networks with other devices and/or computers.

6. The kit assembly of claim 5, wherein the plurality of smart devices and the plurality of sensors are controlled by the software running on the computing device in the kit, other kit(s), and/or other devices remotely over the network.

7. The kit assembly of claim 1, wherein the plurality of smart devices and the plurality of sensors and/or the computing device interact with a plurality of electronic devices, animals, and people through their respective input and output interfaces.

8. The kit assembly of claim 1, wherein the software runs digital assistant, music players, video games, video streaming, instructional videos, video/audio conferencing, telepresence, virtual reality, augmented reality, map, direction guidance, object locator and monitoring, people locator and monitoring, building monitoring, event monitoring, intercom, thermostat, humidity monitor, air filter, humidifier, cooling, heating, cloud services, and other applications.

9. The kit assembly of claim 1, wherein the computing device, the plurality of smart devices and the plurality of sensors are one or more of a microphone, a camera, a security camera, an infrared camera, a temperature sensor, chemical sensors, a light sensor, a moisture sensor, a touch sensor, a motion sensor, a smoke detector, a carbon monoxide detector, a radar, a LIDAR, a radio waves receiver, an RFID reader, a GPS receiver, a video projector, a 2D/3D hologram projector, speakers, lights, a fan, a bladeless fan, lasers, a heater, an air conditioner, a humidifier, a dehumidifier, battery, wireless battery charger, and/or chemical dispensers, wherein projectors, cameras, sensors, and/or software the assembly are used to interact and monitor people, animals, robots, events and/or the environment.

10. The kit assembly of claim 1, further comprising:
   an input interface configured to receive a plurality of input signals such as voice, visual, motion, gesture, temperature, humidity, chemical, radar signal, and laser, and wherein the output is a combination of at least one of a light, a laser, an image, a video, a 3D hologram, a sound, a warm air, a cool air, a water vapor, a chemical, and an electronic alarm.

11. The kit assembly of claim 1, further comprising an electrical light source of fixed or variable color temperature and intensity controlled by the computing device running programmable software or remotely across a wired or wireless network.

12. The kit assembly of claim 1, further comprising:
   a fan assembly, comprising:
      a motor mounted inside a housing; and
      a plurality of blades each affixed to the housing.

13. The kit assembly of claim 1, further comprising:
   a retrofitted can with connectors for additional input and output, comprising:
      air ducts/pipes for cool air and warm air;
      water pipe for water sprinkler, cool air mist;
      data communication wires;
      electrical wires; and
      locks for securing the kit.

14. The kit assembly of claim 1, wherein the retrofitting kit comprising of the light tube, light tube fixture, or flush mount fixture retrofit kit with smart devices, sensors, and/or fan(s).

15. The kit assembly of claim 1, wherein a kit power source is obtained from a connection of a male Edison screw socket for the light fixture being retrofitted to a female Edison screw socket in the light fixture.

* * * * *